US011798075B2

(12) United States Patent
Baumgardner et al.

(10) Patent No.: US 11,798,075 B2
(45) Date of Patent: Oct. 24, 2023

(54) OBTAINING DETAILS REGARDING AN IMAGE BASED ON SEARCH INTENT AND DETERMINING ROYALTY DISTRIBUTIONS OF MUSICAL PROJECTS

(71) Applicant: MUSO.AI INC., North Hollywood, CA (US)

(72) Inventors: Jay Baumgardner, Studio City, CA (US); Aaron Kaufman, Miami, FL (US); Kyran Phillip de Keijzer, Amsterdam (NL)

(73) Assignee: MUSO.AI INC., North Hollywood, CA (US)

( * ) Notice: Subject to any disclaimer, the term of this patent is extended or adjusted under 35 U.S.C. 154(b) by 174 days.

(21) Appl. No.: 17/394,981

(22) Filed: Aug. 5, 2021

(65) Prior Publication Data
US 2021/0366038 A1 Nov. 25, 2021

Related U.S. Application Data

(63) Continuation-in-part of application No. 16/203,137, filed on Nov. 28, 2018, now Pat. No. 11,138,259.

(60) Provisional application No. 62/591,324, filed on Nov. 28, 2017.

(51) Int. Cl.
*G06Q 20/00* (2012.01)
*G06Q 40/03* (2023.01)
*G06Q 20/40* (2012.01)
*G06Q 20/12* (2012.01)

(52) U.S. Cl.
CPC .......... *G06Q 40/03* (2023.01); *G06Q 20/123* (2013.01); *G06Q 20/401* (2013.01)

(58) Field of Classification Search
CPC .... G06Q 40/03; G06Q 20/123; G06Q 20/401; G06Q 10/101
See application file for complete search history.

(56) References Cited

U.S. PATENT DOCUMENTS

| 7,644,273 | B1 | 1/2010 | Stebbings |
| 10,140,515 | B1 | 11/2018 | Waldo |
| 11,080,617 | B1 * | 8/2021 | Bansal ................. G06F 16/235 |
| 2002/0049738 | A1 | 4/2002 | Epstein |
| 2004/0024688 | A1 | 2/2004 | Bi et al. |
| 2006/0180007 | A1 | 8/2006 | McClinsey |
| 2008/0004120 | A1 | 1/2008 | Van Luchene et al. |

(Continued)

*Primary Examiner* — Alexander Khong
(74) *Attorney, Agent, or Firm* — Andrew M. Calderon; Calderon Safran & Cole, P.C.

(57) ABSTRACT

The present disclosure generally relates to determining credits for projects. In an example, a computer-implemented method includes: receiving a request from a requester for credit for participation in a project for production of a hardware or a software product; requesting verification from a creditor that the requester participated in the project by using an artificial intelligence (AI) determination engine to determine if the request includes enough data regarding the project and the creditor to proceed with processing the request; in response to verification of credit from the creditor, acknowledging the credit in a credit handling system comprising a hardware storage retrieval device configured to allow access to the acknowledgment of credit by users other than the requester and the creditor; and in response to the creditor not verifying the request, informing the requestor that the request has been denied.

20 Claims, 10 Drawing Sheets

(56) References Cited

U.S. PATENT DOCUMENTS

| | | |
|---|---|---|
| 2008/0246850 A1 | 10/2008 | Marlowe |
| 2009/0271283 A1 | 10/2009 | Fosnacht et al. |
| 2010/0235741 A1 | 9/2010 | Newman et al. |
| 2012/0197785 A1 | 8/2012 | Cooper et al. |
| 2013/0283203 A1 | 10/2013 | Batraski et al. |
| 2014/0325408 A1 | 10/2014 | Eppanen et al. |
| 2015/0032769 A1 | 1/2015 | Rose |
| 2015/0082338 A1 | 3/2015 | Logan |
| 2015/0200977 A1 | 7/2015 | Wait |
| 2015/0287153 A1 | 10/2015 | Kankanala et al. |
| 2015/0347848 A1 | 12/2015 | Gurovich et al. |
| 2015/0363743 A1* | 12/2015 | Maetz .............. G06Q 10/06311 |
| | | 705/7.13 |
| 2016/0300043 A1 | 10/2016 | Bi et al. |
| 2016/0350333 A1 | 12/2016 | Sacheti et al. |
| 2016/0358161 A1 | 12/2016 | Cobban et al. |
| 2017/0091861 A1* | 3/2017 | Bianchi ................. G06Q 40/03 |
| 2017/0300495 A1 | 10/2017 | Sharifi et al. |
| 2017/0344915 A1* | 11/2017 | Delaney ................ H04W 4/021 |
| 2018/0025004 A1 | 1/2018 | Koenig |
| 2018/0039942 A1 | 2/2018 | Rogers et al. |
| 2018/0041571 A1 | 2/2018 | Rogers et al. |
| 2018/0189390 A1 | 7/2018 | Cremer et al. |
| 2019/0028278 A1 | 1/2019 | Gilson |
| 2020/0143405 A1* | 5/2020 | Tucker .................... G06F 21/10 |
| 2020/0226152 A1 | 7/2020 | Raichelgauz et al. |
| 2020/0320458 A1* | 10/2020 | Loreto ................ G06F 16/2365 |
| 2022/0284506 A1* | 9/2022 | Follmer ................. G06N 20/00 |
| 2022/0383258 A1* | 12/2022 | Stewart ................ G10H 1/0008 |

\* cited by examiner

US 11,798,075 B2

OBTAINING DETAILS REGARDING AN IMAGE BASED ON SEARCH INTENT AND DETERMINING ROYALTY DISTRIBUTIONS OF MUSICAL PROJECTS

BACKGROUND

The present invention generally relates to obtaining details regarding an image based on search intent and, further, to determining royalty distributions and credits for projects.

SUMMARY

In an aspect of the invention, a computer-implemented method comprises: receiving, via a computing device, a request from a requester for credit for participation in a project for production of a hardware or a software product; requesting, via the computing device, verification from a creditor that the requester participated in the project, including using an artificial intelligence (AI) determination engine to determine if the request includes enough data regarding the project and the creditor to proceed with processing the request; in response to verification of credit from the creditor, acknowledging the credit in a credit handling system comprising a hardware storage retrieval device configured to allow access to the acknowledgment of credit by users other than the requester and the creditor; and in response to the creditor not verifying the request, informing, via the computing device, the requestor that the request has been denied.

In further aspects of the invention, a credit requesting and handling system for providing credit to a requester for participation in a project for production of a hardware or a software product, comprising: a credit requesting system configured to receive a request from the requester for credit for participating in the project from a creditor, wherein the credit requesting system includes an artificial intelligence (AI) determination engine to determine if the request includes enough data regarding the project and the creditor to proceed with processing the request; and a credit handling system configured to provide the request to a creditor that participated in the project to request the creditor to vouch for participation of the requester in the project and to store verification from the creditor that the requester participated in the project in a hardware storage retrieval device configured to allow access to the acknowledgment of credit by users other than the requester and the creditor.

In another aspect, a computer program product for providing credit to a requestor for participation in a project, the computer program product comprising a computer readable storage medium having program instructions embodied therewith, the program instructions executable by a computing device to cause the computing device to: receive a request from the requester for credit for participation in the project; request verification from a creditor that the requester participated in the project; in response to verification of credit from the creditor, acknowledge the credit in a credit handling system accessible by the requester; and in response to the creditor not verifying the request, inform the requestor that the request has been denied.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
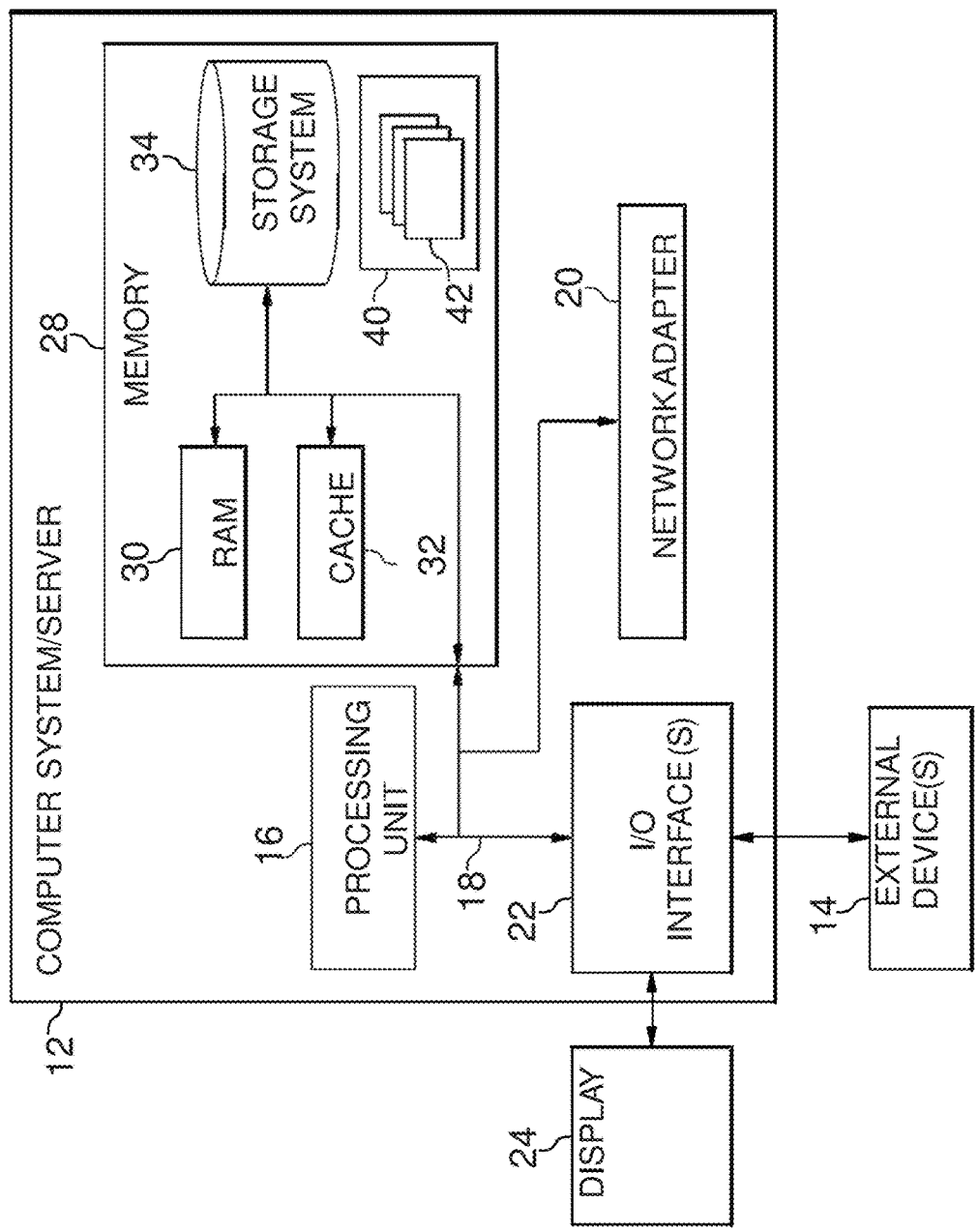
FIG. 1 shows an illustrative environment for managing the processes in accordance with aspects of the invention.

The present invention generally relates to obtaining details regarding an image based on search intent and, further, to determining royalty distributions and credits for projects. An image search application may identify an object in an image captured or stored by a user device (e.g., smartphone, tablet, laptop/desktop computer, etc.), perform a web search of the identified object, and return search results to the user. In addition to performing a web search based on a search query that includes words describing the identified object, aspects of the present invention may determine an intent of the user based on an image in order to return more relevant search results rather than results returned from a generic web search.

As an example, aspects of the present invention may search one or more external data servers to identify search trends from social media platforms, search engines, newsfeeds, etc. to better identify the intent of an image based search. For example, if a search for a particular object is trending, aspects of the present invention may identify the types of webpages that other users are accessing in relation to the object. Accordingly, when a search for the particular object is subsequently executed, aspects of the present invention may return search results (e.g., webpages) that are based on searching trends, thereby providing more relevant search results to the user.

In embodiments, aspects of the present invention may execute logic to identify the intent of the user in an image based search based on the attributes of objects in the image (e.g., the type of object, the condition of the object, etc.) or the context of which the image was found, identified, etc. As an example, if the image includes a machine or apparatus (e.g., a musical production device found in a recording studio), aspects of the present invention may determine that the image includes a machine and thus the intent of the search is to obtain operating instructions for the machine or apparatus. Accordingly, aspects of the present invention may execute a search for operating instructions for the machine. As another example, if the image includes a broken object, aspects of the present invention may determine that the intent of the search is to obtain repair instructions based on the image being of a broken object that the user may wish to repair.

In embodiments, aspects of the present invention may generate a search query that includes words describing the object as well as the intent of the search query, provide the search query to a search application, and return search results. As an example, aspects of the present invention may generate a search query having the words: "operating instructions for Roland JD-XA synthesizer" based on recognizing the model of the object in the image, a type of image, and other data relating to the intent of the search (e.g., social media posts, search tends, etc.). As such, aspects of the present invention may generate a search query that includes a description of an object in the image, as well as the intent of the search. Also, the search query may include additional parameters, such as a particular group of web domains to search based on the intent of the search.

In embodiments, aspects of the present invention may return search results that are based on a rich set of metadata associated with an object identified in an image. For example, if the image includes an object of a guitar, aspects of the present invention may identify a rich set of metadata associated with the guitar from a database (e.g., a blockchain-based database), such as a make/model of the guitar, famous artists that have used the guitar, published songs in which the guitar was used to record the song, etc. Further, additional details can be explored, such as additional metadata regarding the song in which the guitar was used (e.g., lyrics of the song, individuals that contributed to the song, and royalty distributions and credits regarding the song, etc.).

In embodiments, the systems, processes and computer programs described herein may return search results of an object associated with albums, tracks, and/or artists. For example, if an album, track or artist uses a specific type of gear (e.g., musical instrument), the systems, processes and computer programs described herein may identify the specific type of gear and allow purchase of the specific type of gear. In further embodiments, the systems, processes and computer programs described herein may return search results of settings associated with the specific type of gear. For example, if a picture is taken of the specific type of gear, the systems, processes and computer programs described herein may identify settings of the specific type of gear that will allow the specific type of gear to sound like a specific artist, track, album, etc. Further, when an augmented reality (AR) viewer uses the specific type of gear, the systems, processes and computer programs described herein may identify settings of the specific type of gear that will allow the specific type of gear to sound like the specific artist, track, album, etc., within the augmented reality (AR) experience.

In many fields the distribution of royalties is an important part of the compensation for a person's contributions to a project. For example, in the musical field, musical projects and songs are produced by a team having various contributors (e.g., musicians, artists, producers, sound technicians, record label personnel, etc.). When a musical project is monetized, royalties are often split among the individual contributors. The rich set of metadata may also be used to divide royalties for songs across project contributors. For example, royalty payments maybe based on distribution rules, such as:

Smart contracts stored in the blockchain-based database of rich set of metadata

A percentage or division split to contributors involved in a project

Documentation on fee for services used in the project (e.g., work for hire musicians)

First to be paid (e.g., Person X receives the first $10,000 and any amount greater is split among others into a remainder percentage)

Recouping (e.g., Person X receives the first $10,000 and any amount greater is split among person X and others into a remainder percentage)

Close Account Out (e.g., Person X receives royalties for a period of time and is then removed from future royalties, which may be used for promoters and/or marketing).

In further embodiments, the systems, processes and computer programs described herein may include evidence based royalties for discovery. For example, if royalties were not executed correctly in the system, the systems, processes and computer programs described herein can identify evidence based royalties for discovery from chat messages, SMS, etc. In particular, the chat messages, SMS, etc. can include agreed upon royalties between parties. In other words, if a team of collaborators, for example, agree to a certain royalty split and such is noted in the chat messages or other electronic format, then the agreed upon royalty split can be used for later discovery if royalties were not previously executed correctly.

In addition to royalties, contributors to a project also want credit for the work they have done, i.e., recognition of their contribution to the project. More specifically, many projects, such as musical projects, video projects, engineering projects etc., will require large teams of contributors, and it is necessary to provide accurate and efficient mechanisms to provide appropriate credits for contribution at the time of production of the project. It is also desirable to provide a mechanism by which credit can be given after the production of the project has been completed to ensure that those who have contributed to the project will be able to receive appropriate credit for their contributions in the event that they may not have received appropriate credit at the time of the original production.

Typically, credits for contributors for projects such as musical projects, videos, television programs, movies etc., are shown at the beginning and/or at the end of visual presentation of the projects, or, for example, in written form on casings for CDs, DVDs, etc. However, because of the large number of contributors frequently involved in such projects, and the often busy nature of the production process, many times contributors are not given proper credit for their contributions. In accordance with aspects of the present disclosure, a requester is allowed to request credit and obtain vouching from a verified creditor for obtaining such credit for participation in a project, such as a musical project, film project or any other project, either while the production is still in process or after the production has been completed. In particular, the present invention provides a crediting system and a method by which users can register in the crediting system to request credit for contributions they made to a project, including a project completed in the past, and to have a creditor (i.e., a person who provides verification of the person's contributions to the project) vouch for the person's participation and contributions to the project.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The block diagrams in the Figures illustrate the architecture, functionality, and operation of possible implementations of systems, methods, and computer program products according to various embodiments of the present invention. In this regard, each block in the block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams illustration, and combinations of blocks in the block diagrams, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
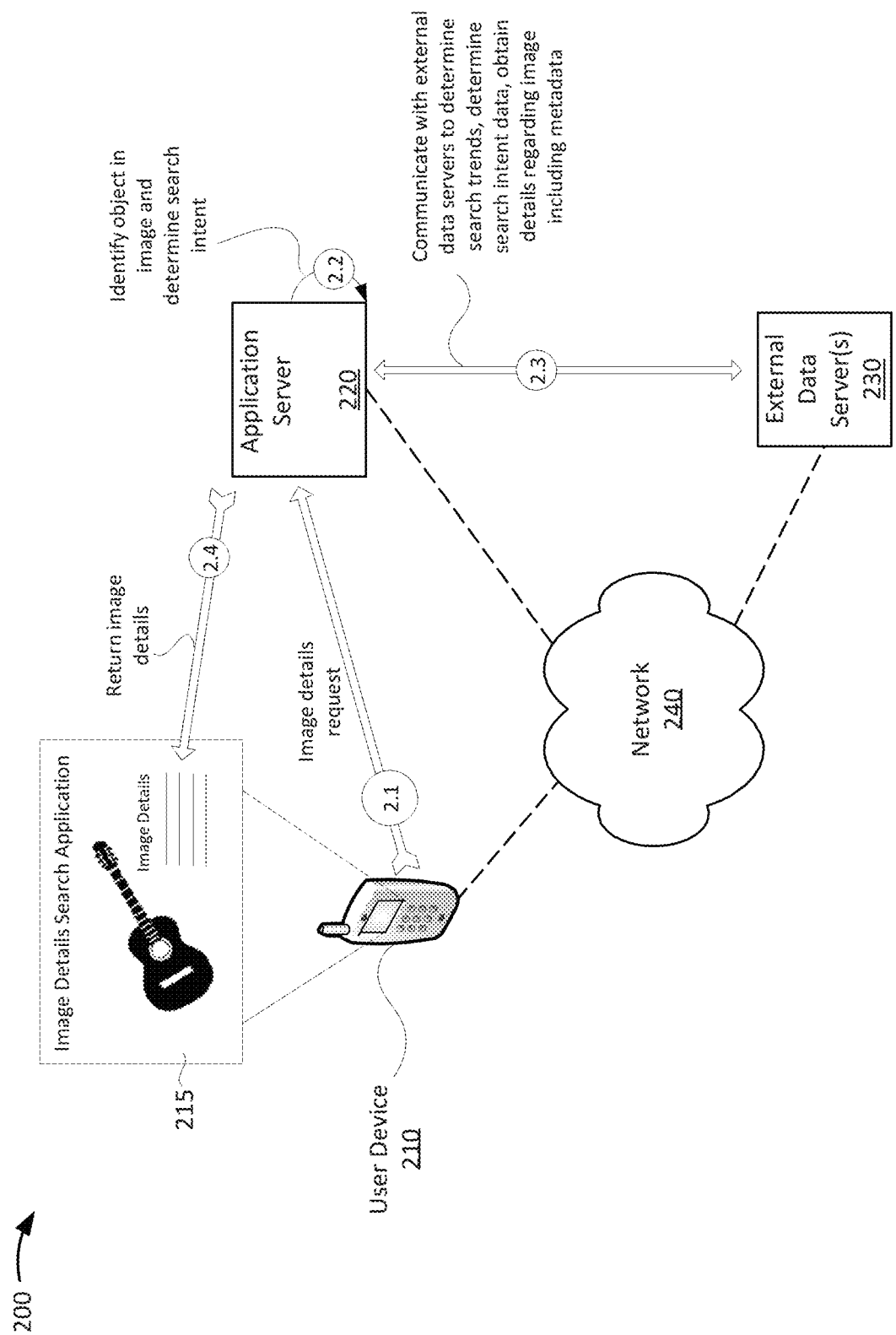
FIG. 2 shows an overview of an example implementation in accordance with aspects of the present invention.

FIG. 2 shows an overview of an example implementation and environment 200 in accordance with aspects of the present invention. As shown in FIG. 2, environment 200 may include a user device 210, an application server 220, and one or more external database servers 230 which may all communicate via a network 240. As shown in FIG. 2, the user device 210 may host a search application (e.g., in interface 215) whereby a user may capture an image of an object and request details regarding the image. In the example shown, the user may use the user device 210 to capture an image of a guitar and request details regarding the image. In alternative embodiments, the image can be any captured metadata for film, television, video games and other forms of media as described herein.

At step 2.1, the user device 210 may request image details (e.g., perform an image details search) by providing a request to an application server 220. At step 2.2, the application server 220 may identify an object in the image (e.g., the guitar, the type of guitar, model of the guitar, etc.) and may determine an intent of the search or image details request. For example, at step 2.3, the application server 220 may communicate with one or more external database servers 230 to determine search trends associated with the object, and obtain other data relating to the intent of the user's search (e.g., based on the attributes of the object in the image, type of object in the image, etc.).

In embodiments, the application server 220 may generate a search query that describes the object, the intent of the search, and/or domains or webpages to search based on the intent of the search. The application server 220 may communicate with the one or more external database servers 230 to obtain search results based on the query, including a rich set of metadata (e.g., from a blockchain-based database) associated with the object in the image. At step 2.4, the application server 220 may return image details which may be overlaid on top of the image captured by the user within the user interface 215. For example, the details may be overlaid on top of the image, to the left of the image, to the right of the image, over the image, under the image, and/or text wrapped around the image.

In embodiments, the search operations provided by the application server 220 may be provided by a content or search provider or other third party to be used as a service. The provider may include, for example, a product manufacturer (e.g., of musical equipment, consumer electronics, automobiles, personal items, etc.), a music production company, a content streaming service provider, or the like.

As an illustrative example, the application server 220 may obtain a rich set of metadata associated with the guitar from a database (e.g., a blockchain-based database), such as a make/model of the guitar, famous artists that have used the guitar, published songs in which the guitar was used to record the song, etc. Further, additional details can be explored, such as additional metadata regarding the song in which the guitar was used (e.g., lyrics of the song, individuals that contributed to the song, royalty distributions regarding the song, etc.).

The rich set of metadata may also be used to divide royalties for songs across project contributors. For example, royalty payments may be based on distribution rules, such as:

Smart contracts stored in the blockchain-based database of rich set of metadata (which can be representative of the storage system of FIG. 1);

A percentage or division split to contributors involved in a project;

Documentation on fee for services used in the project (e.g., work for hire musicians);

First to be paid (e.g., Person X receives the first $10,000 and any amount greater is split among others into a remainder percentage);

Recouping (e.g., Person X receives the first $10,000 d any amount greater is split among person X and others into a remainder percentage); and/or Close Account Out (e.g., Person X receives royalties for a period of time and is then removed from future royalties, which may be used for promoters and/or marketing).

Still further, the rich set of metadata may include data necessary for determining whether a requester will be given credit in a crediting system for contributions they made to a project, as will be discussed below with regard to FIGS. 6-9B.

In embodiments, the application server 220 may return search results of an object associated with albums, tracks, and/or artists. For example, if an album, track or artist uses a specific type of gear (e.g., musical instrument), the application server 220 may identify the specific type of gear and allow purchase of the specific type of gear. Also, if a picture is taken of the specific type of gear, the application server 220 may identify settings of the specific type of gear that will allow the specific type of gear to sound like a specific artist, track, album, etc. Further, when an augmented reality (AR) viewer uses the specific type of gear, the application server 220 may identify settings of the specific type of gear that will allow the specific type of gear to sound like the specific artist, track, album, etc., within the augmented reality (AR) experience.

As shown in FIG. 2, the user device 210, the application server 220, and the external data servers 230 may communicate via the network 240. The network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

FIGS. 3-6, 7A, 7B, 8, 9A and 9B show flow diagrams implementing example embodiments in accordance with aspects of the present invention. The flowcharts illustrate the architecture, functionality, and operation of possible implementations of systems, methods, and computer program products according to various embodiments of the present invention including being implemented in the computing node 10 of FIG. 1. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
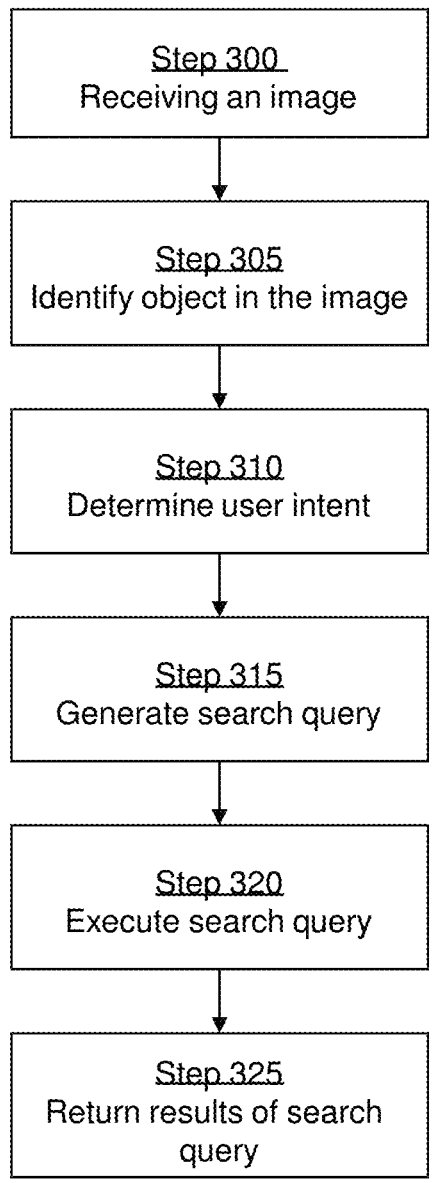
FIGS. 3-5 show flow diagrams implementing example embodiments in accordance with aspects of the present invention.

More particularly, FIG. 3 shows at step 300, receiving, by a computing device, an image as part of a request to receive information regarding an object in the image, wherein the image is received via an application hosted by a user device. In embodiments, the object can be from any database which stores information about media, e.g., film, television, video games, virtual reality, augmented reality, etc. and other forms of media as described herein. At step 305, the processes identify, by the computing device, the object in the image, e.g., guitar or other hardware or equipment. At step 310, the processes determine, by the computing device, a user intent based on identifying the object, wherein the determining the user intent is based on at least one selected from the group consisting of: search trends associated with the object, attributes of the object, a type of the object, and a condition of the object. At step 315, the processes generate, by the computing device, a search query based on the identifying the object and the user intent. At step 320, the processes execute, by the computing device, the search query, wherein the executing includes accessing one or more blockchain-based databases storing metadata associated with any of the objects described herein. At step 325, the processes return, by the computing device, results to the search query, wherein the returning the results includes presenting the search results within the application and overlaid on or around the image within a user interface of the user device.

Figure 4:
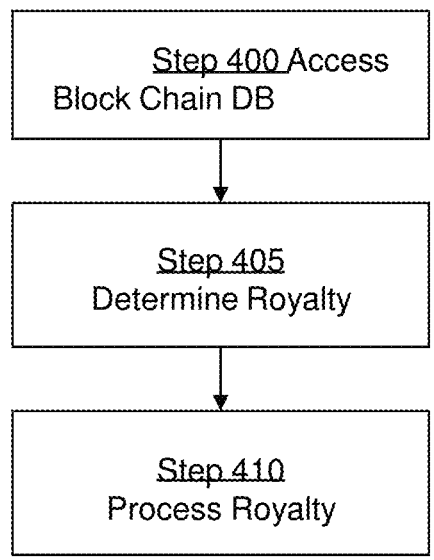

In FIG. 4, at step 400, the processes access, by a computing device, a blockchain-based database storing metadata identifying a plurality of contributors for a musical project. At step 405, the processes determine, by the computing device, royalty distributions for the plurality of contributors based on one at least one selected from the group consisting of: smart contracts stored in the blockchain-based database; a percentage or division split to the contributors; documentation on fee for services used in the musical project; information identifying which of the plurality of contributors should be paid a first amount of a total amount; information identifying a time period that a particular contributor of the plurality of contributors is to receive royalties. In further embodiments, it is further contemplated that the royalties can be determined by the computing device evidence based discovery. For example, evidence based royalties may be obtained from chat messages, SMS, etc., in order split royalties in a manner contemplated by all contributors. At step 410, the processes provide, by the computing device, information regarding the royalty distributions.

In further embodiments, the systems and processes described herein provide the ability to generate audience specific marketing playlists. For example, using the features described with respect to FIGS. 1-5, with the data gathered using the systems and processes described herein, it is now possible to generate musical playlists for the marketing purposes of brands. By way of example, Gibson guitar manufacturer can now sponsor a playlist on a music streaming service that has the top 10 songs with one of their guitars, or a School like Berkley School of Music sponsoring a playlist that contains the songs of top drummers that went to their school. Accordingly, with the metadata captured, it is now possible to match this data to songs in existing music players through relations, and have the ability to, for the first time, use music playlists in digital marketing. These types of actions can be done by capturing the metadata as described herein.

In further embodiments, the systems and processes described herein can expand the metadata capture from music projects to entertainment projects. With capturing metadata there is no need to limit it to only the music industry, as it is possible now capture metadata for film, television, video games and other forms of media (including virtual reality (VR) and augmented reality (AR)). Overall the systems and processes described herein is capable of capturing the necessary metadata within entertainment projects for royalty purposes, but in general also recognition, contract payment (e.g., did this person really work on this project), and building of the user's resume.

In embodiments, the use of film gear and video game gear can be used to capture additional information similar to that of the musical instruments for music projects. This should not be limited to only film and video game gear, but also other types of hardware. For example, Take, for example, hardware AR glasses worn by the user to see digital creations embedded in the real world can be captured. Accordingly, it is now possible to use such devices in additional to musical instruments to capture metadata for AR projects.

Figure 5:
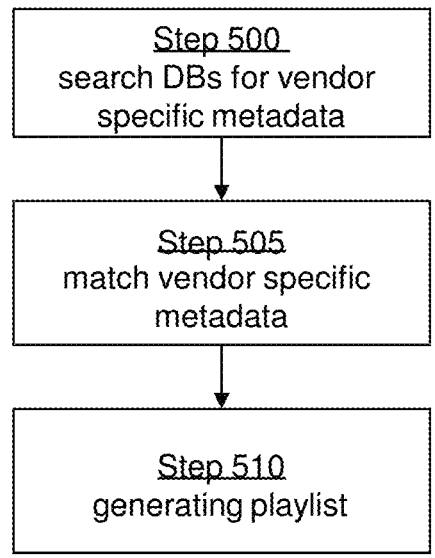

More specifically, the implementation shown in FIG. 5 shows a flowchart which can be a computer program product for generating a playlist. The computer program product comprises a computer readable storage medium (non-transitory) having program instructions embodied therewith. The program instructions are executable by a computing device (e.g., computing node 10 of FIG. 1) to cause the computing device to: search one or more databases for vendor specific metadata (step 500); match the vendor specific metadata to relationships of the user (step 505); and generating an audience specific marketing playlist using the matched vendor specific metadata (step 510). The database can be a blockchain-based database. The vendor specific metadata obtained from multimedia. The multimedia is one of music, film, television, video games, virtual reality and augmented reality. The vendor specific metadata is a hardware device, which be a musical instrument, for example.

Figure 6:
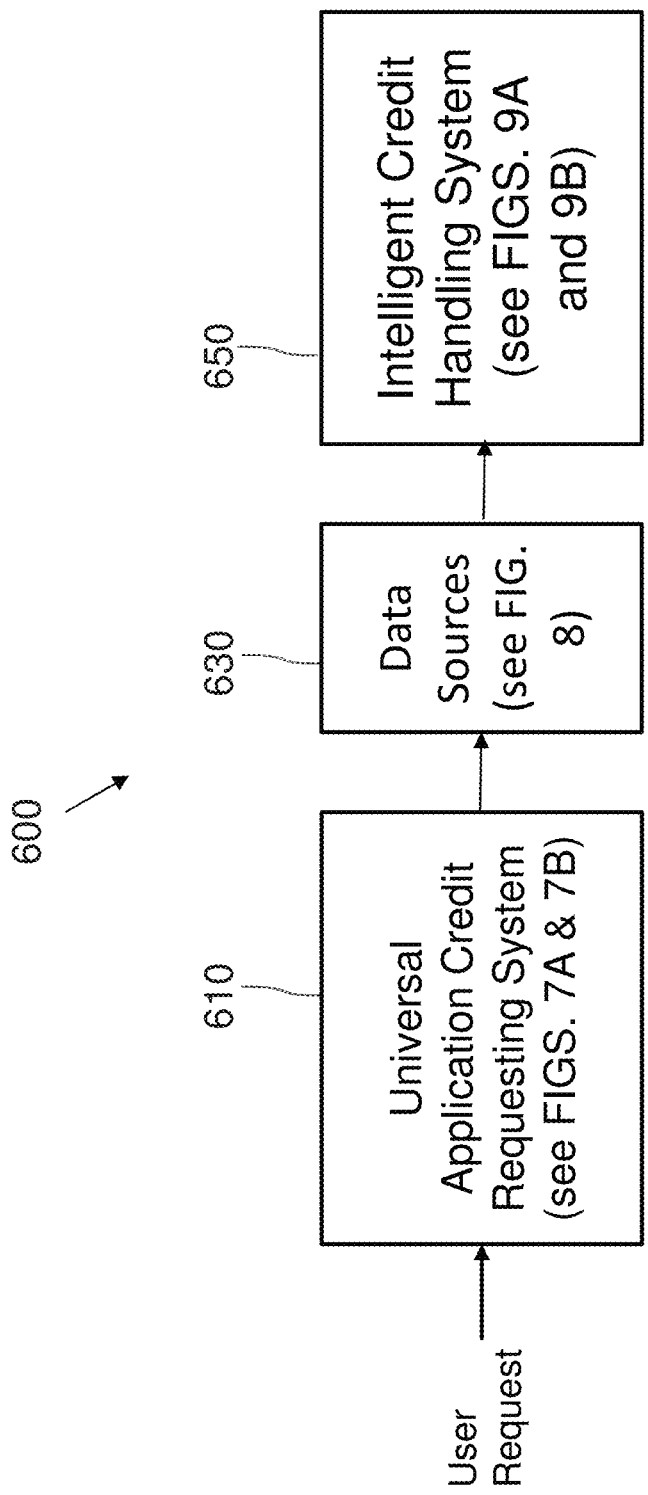
FIG. 6 shows a credit requesting and handling system in accordance with aspects of the present invention.

FIG. 6 shows a credit requesting and handling system 600 in accordance with aspects of the present invention. Specifically, FIG. 6 shows the credit requesting and handling system 600 being formed of three sections, specifically, a universal application credit requesting system 610, data sources 630 and an intelligent credit handling system 650. As will be explained in greater detail with regard to FIGS. 7A and 7B, the universal application credit requesting system 610 utilizes interfaces, request credit domains, an artificial intelligence (AI) look up step and an AI determination engine to allow a Requester to request credit for contributions they made to a project. As will be explained in greater detail with regard to FIG. 8, the request is analyzed using data sources including external contact information and data captured by the user from verified profiles. As will be explained in greater detail with regard to FIGS. 9A and 9B, the request is handled by an intelligent credit handling system 650 to provide for vouching by a Creditor for the contribution of the Requester.

Figure 7A:
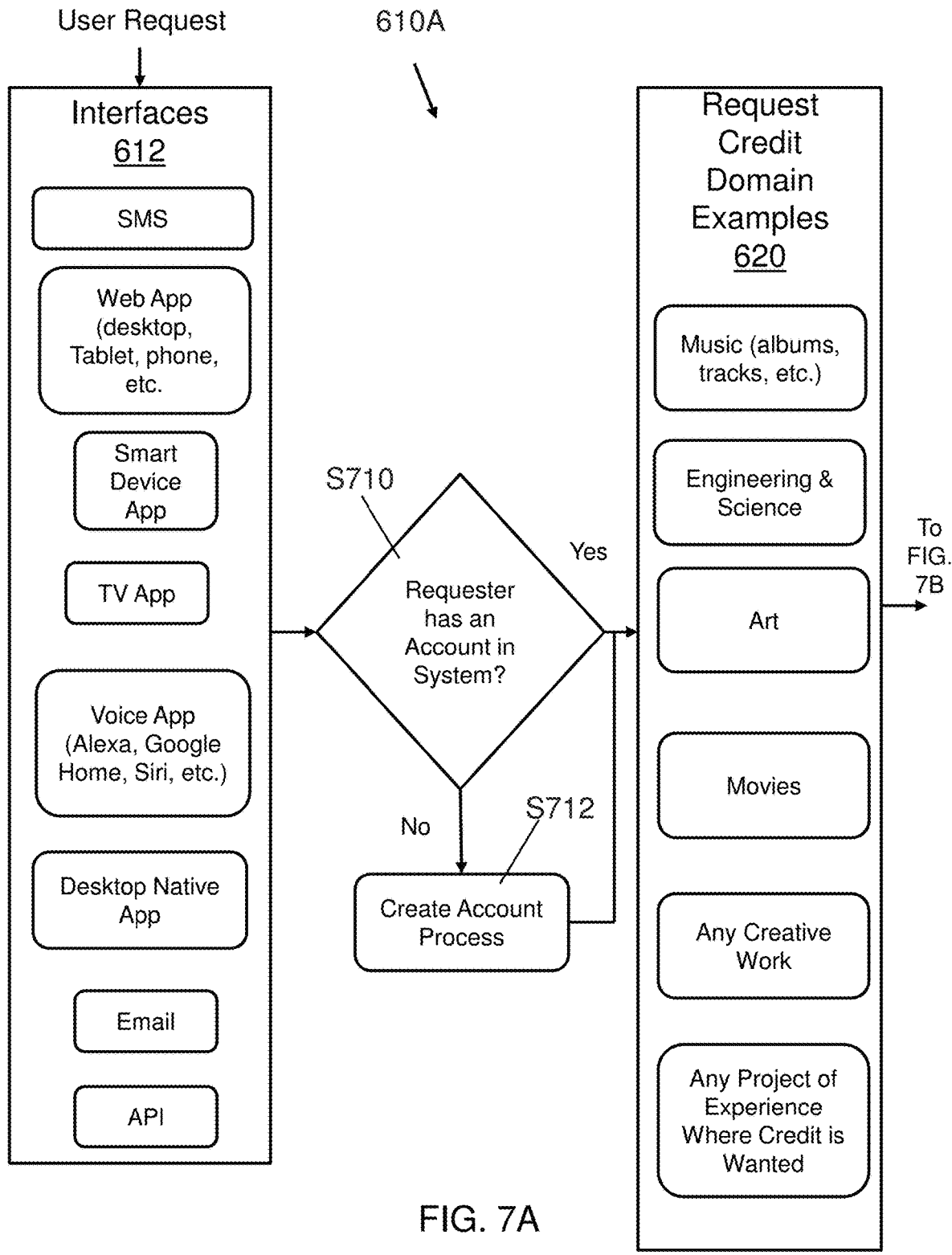
FIGS. 7A and 7B show a universal application credit requesting system of the credit requesting and handling system of FIG. 6.

FIG. 7A shows a first portion 610A of the universal application credit requesting system 610 of the credit requesting and handling system 600 of FIG. 6. As shown in FIG. 7A, a user, i.e., a "Requester," request for credit is first provided to interfaces 612. These interfaces 612 can include, but are not limited to: SMS; web apps, such as desktop apps, tablet apps, phone apps, etc.; smart device apps; TV apps;

voice apps, such as Alexa, Google Home, Siri, etc.; desktop native apps; emails; and APIs. The request, as provided by one of the interfaces 612, is then passed to step S710, which determines whether the Requester has an account in the credit requesting and handling system 600. If the Requester does have an account in the system, then the request is passed on to the request credit domain examples 620, which determined what type of hardware or software product the project for which credit is being requested pertains to. After determining the type of project by the request credit domain examples 620, the request is passed on to the steps shown in FIG. 7B for utilizing an AI lookup step 720 and an AI determination engine 730 to determine if the request should be passed on to the data sources of FIG. 8 and the intelligent credit handling system 650 of FIGS. 9A and 9B. If the Requestor does not have an account in the credit requesting and handling system 600, then an account is created in step S712 so that the credit request operation can proceed. In accordance with aspects of the present invention, both the Requester and the Creditor should be registered with the crediting system in order to respectively request and vouch for credit for contributions to a project. The credit domain examples 620 include, but are not limited to: music projects, e.g., albums, tracks, etc.; engineering and science projects; art projects; movie projects; or any other creative work or project where credit is desirable.

Figure 7B:
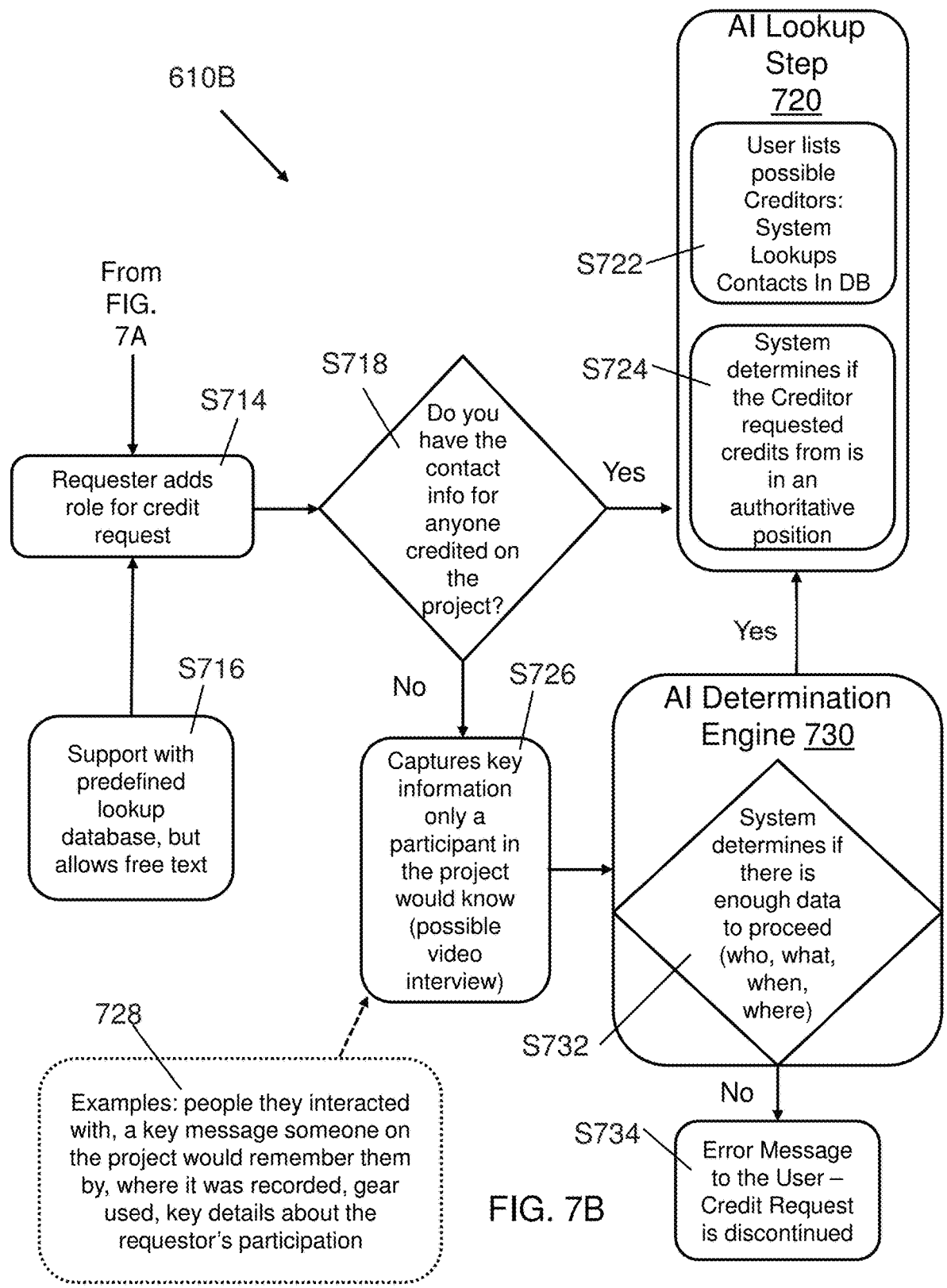

FIG. 7B shows a second portion 610B of the universal application credit requesting system 610 of the credit requesting and handling system 600 of FIG. 6. The determination of the request credit domain examples 620 as to what type of project is involved is applied to step S714 in which the Requester adds the role of the Requester in the project. Step S716 provides support regarding the role from a predefined lookup database, but also allows free text to be provided by the Requester regarding the role.

Step S718 determines whether there is contact information for anyone credited on the project. If step S718 determines that there is contact information for someone credited on the project already, the request is passed on to the AI lookup step 720. The AI lookup step 720 includes steps S722 and S724. Step S722 looks up contact information for possible Creditors listed by the Requester in a contact database. The processes of step 724 determines if the Creditors from whom credit is requested are, in fact, Creditors in authoritative positions with regard to the project, and, as such, able to vouch for the Requester's request for credit.

In step S718, if it is determined that there is not contact information for someone credited on the project already, then the process of step S726 attempts to capture key information that only a participant in the project would know, for example, a possible video interview. Examples 728 of such key information to be used in step S726 are, but are not limited to, people the Requester interacted with, a key message someone on the project would remember the Requester by, where the project was recorded, gear that was used in the project and other key details about the Requestor's participation.

Still referring to FIG. 7B, the steps S722 and S724 of the AI lookup step 720 are based on determinations provided by the AI determination engine 730. More specifically, the AI determination engine 730 determines, via step S732, if there is enough data to proceed with the request, for example, what, when and where. If sufficient data does exist, this determination is provided to the AI lookup step 720 so that the request can proceed to handling by the intelligent credit handling system 650, shown, for example, in FIGS. 9A and 9B. If the process of step S732 determines that sufficient data does not exist, this determination is provided to step S734 to provide an error message to the user (i.e., the Requester), and the credit request is discontinued.

Figure 8:
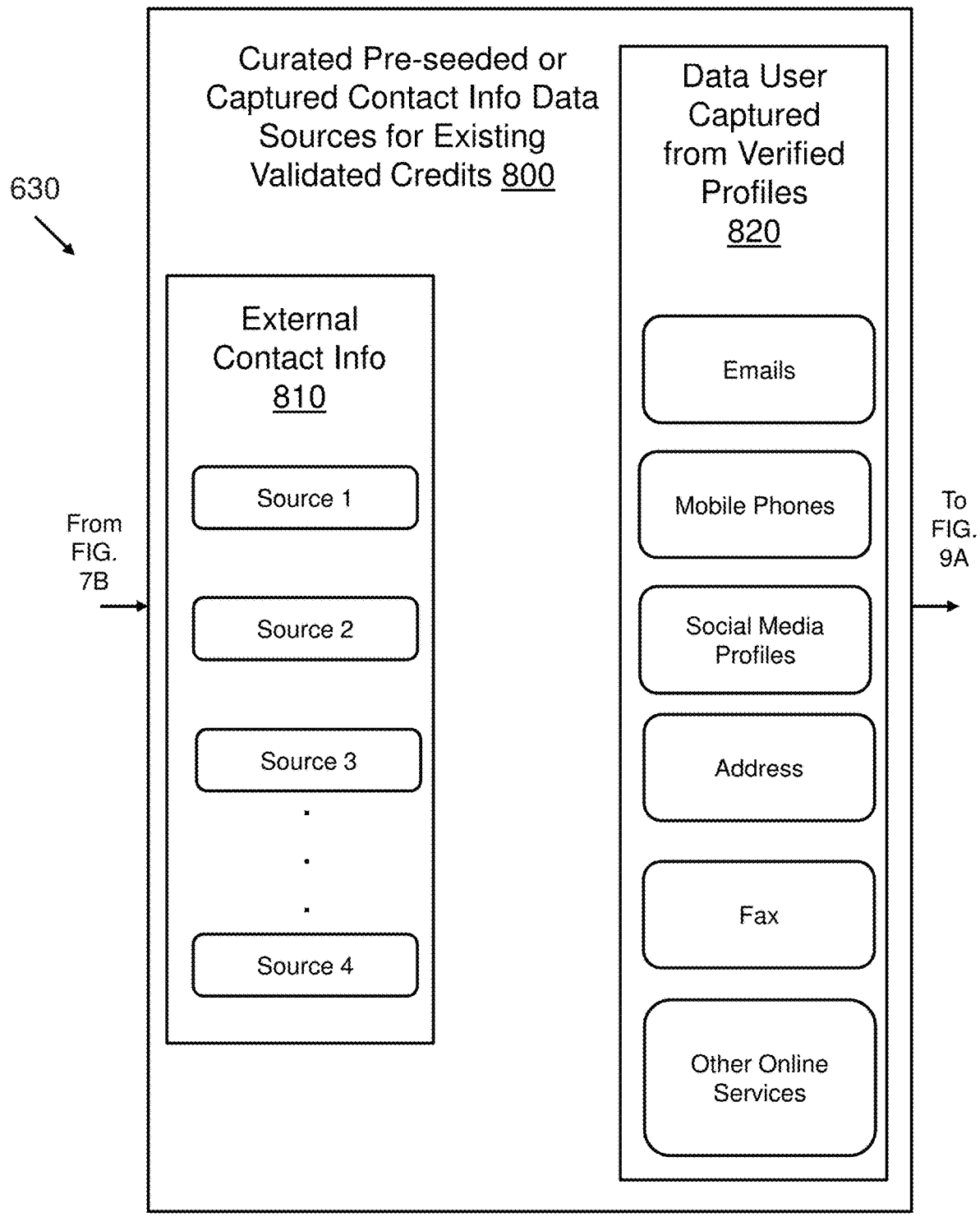
FIG. 8 shows data sources of the credit requesting and handling system of FIG. 6.

FIG. 8 shows the data sources 630 of the credit requesting and handling system 600 of FIG. 6. More specifically, FIG. 8 shows curated pre-seeded or captured contact information data sources 800 for existing validated credits. These curated pre-seeded or captured contact information data sources 800 include external contact information sources 810 of the credit requesting and handling system 600 and data which is user captured from verified profiles 820. The external contact information sources 810 may include a plurality of sources, such as shown in FIG. 8 as Source 1-Source 4, which provide data to the credit requesting and handling system 600 from known external sources. The data 820 which is user captured from verified profiles is data which the credit requesting and handling system 600 may request from various data sources such as emails, mobile phones, social media profiles, addresses, faxes and other online sources, as shown in FIG. 8.

Figure 9A:
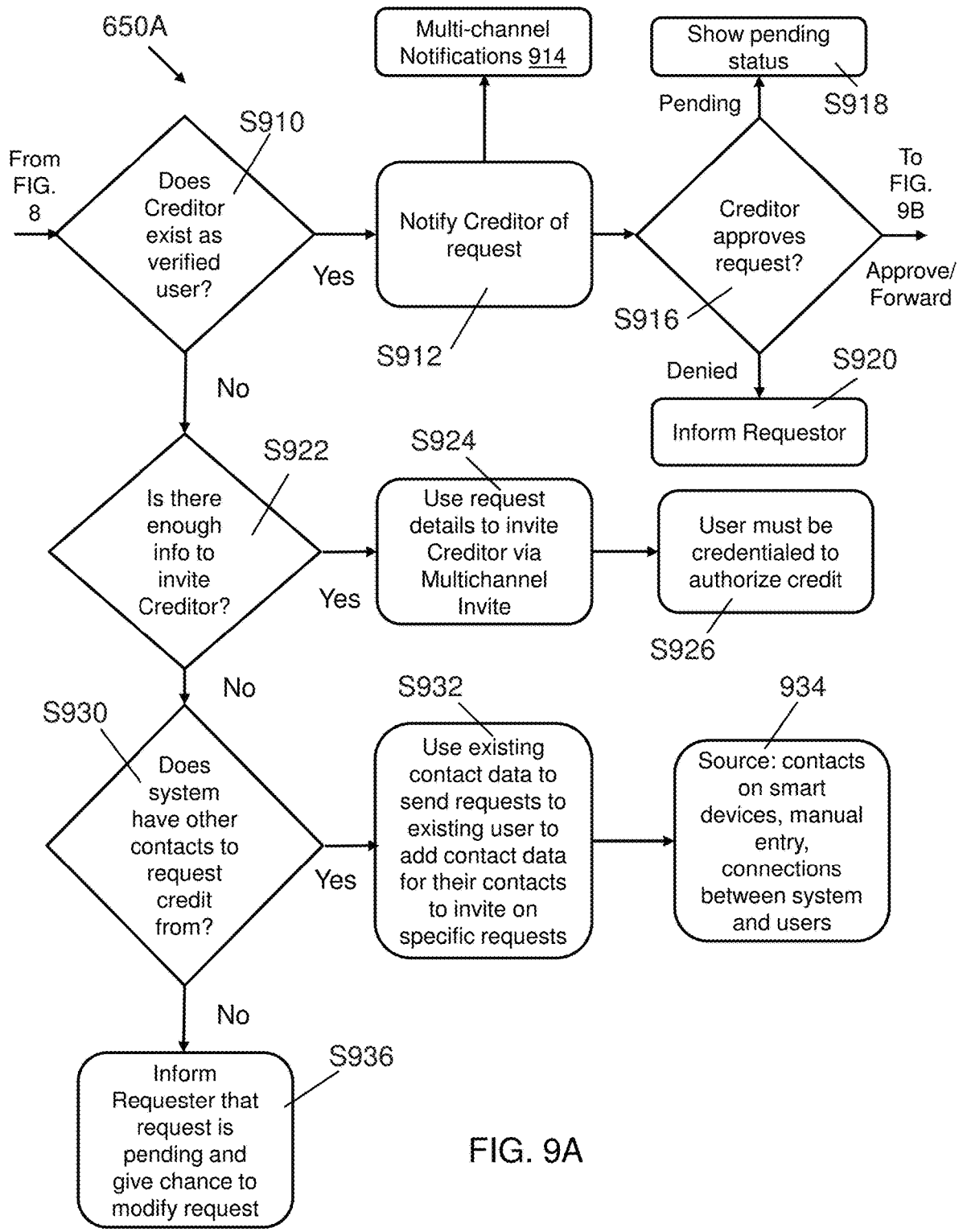
FIGS. 9A and 9B show an intelligent credit handling system of the credit requesting and handling system of FIG. 6.

FIG. 9A shows a first portion 650A of the intelligent credit handling system 650 of the credit requesting and handling system 600 of FIG. 6. Referring to FIG. 9A, at step S910, the request for credit which has been processed through the data sources of FIG. 8 is reviewed to determine whether a Creditor exists as a verified user of the system 600. If it is determined that a Creditor exists as a verified user in the system 600, the Creditor is notified of the request for credit in a project from the Requester. This notification to the existing Creditor may be performed via multi-channel notifications 914, as shown in FIG. 9A.

Figure 9B:
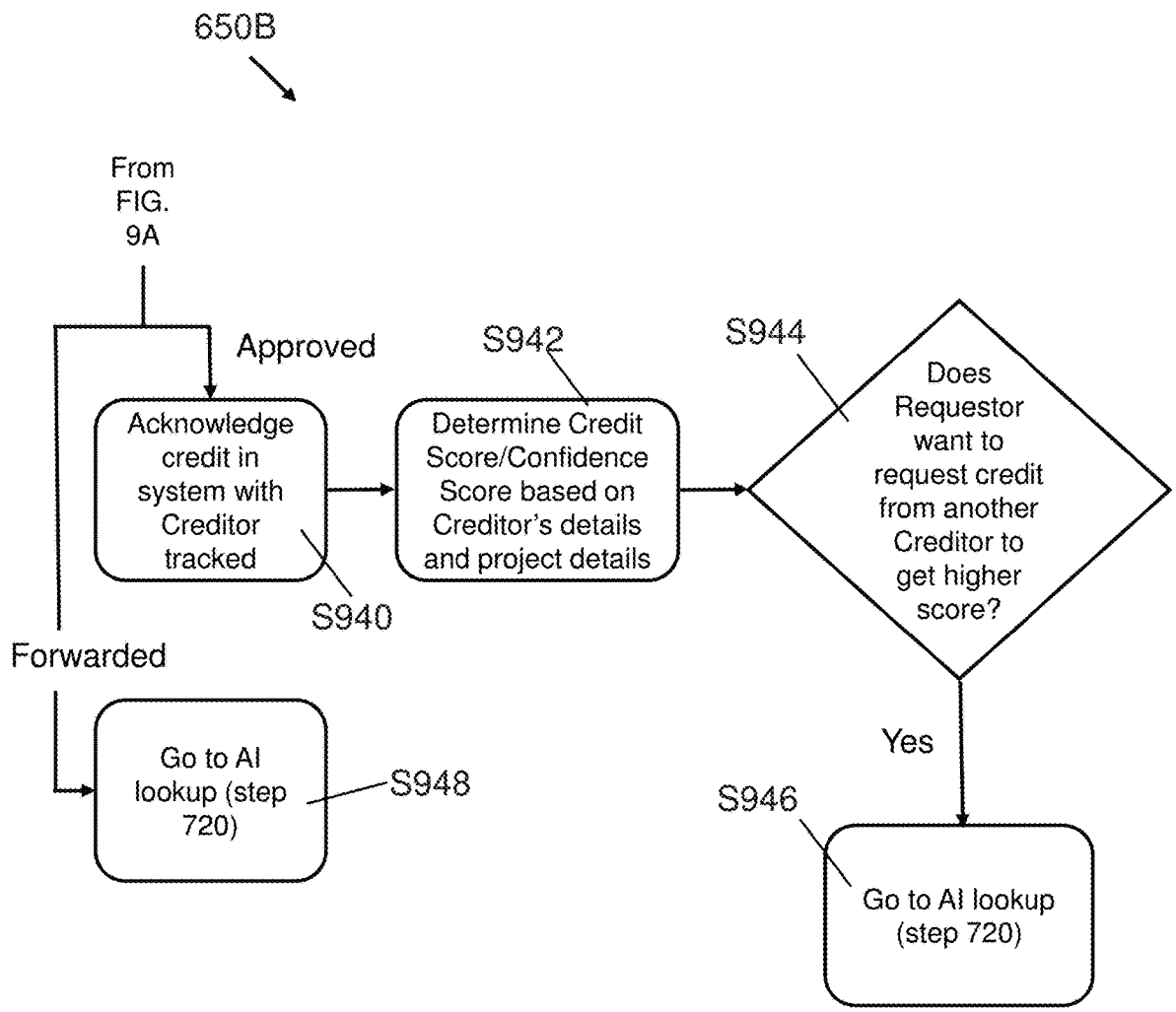

Still referring to FIG. 9A, in step S916, it is determined whether the Creditor approves the request of the Requester for credit on the project. If the Creditor does approve the request, this approval is sent for further processing to the elements shown in a second portion 650B of the intelligent credit handling system 650 of the credit requesting and handling system 600, as shown in FIG. 9B. If the Creditor denies the request, the Requester is informed of this denial in step S920. During the time that the Creditor is reviewing the request to make a decision, the pending status is shown in step S918, which may be provided to the Requester. Finally, if the Creditor wishes to forward the request to another Creditor to make the decision, rather than making the decision, the request will be provided to the elements of FIG. 9B, as shown in FIG. 9A.

On the other hand, if step S910 of FIG. 9A indicates that a Creditor for the project does not exist as a verified user in the credit requesting and handling system 600, the request is passed to step S922 to determine if there is enough information to invite another Creditor who is registered in the credit requesting and handling system 600 to review the request. If the process of step S922 determines that there is enough information to invite another Creditor, then the request details are used in step S924 to invite this other Creditor via a multichannel invite. As shown in step S926, the new Creditor should be credentialed to authorize providing credit to the Requester with regard to the particular project in question. If the Creditor is credentialed to authorize the requested credit, the request is passed to step S912, where it is processed in the manner discussed above.

Still referring to FIG. 9A, if the process of step S922 determines that there is not enough information to invite a Creditor from within the credit requesting and handling system 600, then the process of step S930 determines whether the system has other contacts that credit could be requested from. If the process of step S930 determines that the system does have other contacts that credit can be requested from, the request is passed to step S932, which uses existing contact data in the system 600 to send requests to existing users of the system 600 to add contact data for their contacts to invite on specific requests for credit at step S934. The sources for such contact data include contacts on smart devices, manual entry, or other connections between the credit requesting and handling system 600 and users of the system. Finally, if the process of step S930 determines that the system does not have other contacts to request credit from, then the Requester is informed in step S936 that the request is pending, and gives the Requester a chance to modify the request so that the credit requesting and handling system 600 can re-process the request to determine if a Creditor exists within the system for approving a modified request.

FIG. 9B shows a second portion 650B of the intelligent credit handling system 650 of the credit requesting and handling system 600 of FIG. 6. As discussed above with regard to the steps shown in FIG. 9A, if the Creditor approves the request for credit by the Requester in step S916, this approval is passed to step S940 which acknowledges credit in the system and informs the Requester that the request for credit has been approved, and stores the acknowledgment of credit in a hardware storage retrieval device, such as the storage system 34 shown in FIG. 1, configured to allow access to the acknowledgment of credit by users other than the requester and the creditor. In embodiments the Creditor may be tracked to determine an appropriate score to be provided to the crediting being given by the particular Creditor. More specifically, the Creditor may be tracked to determine details of the Creditor's role in the project, and the project details to determine a credit score/confidence score in step S942.

In step S944, it is determined whether the Requester wants to request further credit from another Creditor in the system to obtain a higher score. If the Requester does want to attempt to obtain credit from another Creditor to get a higher score in step S944, then, as shown in Step S946, the process will proceed to the AI lookup step 720 of FIG. 7B to begin the credit requesting process again. Similarly, if the original Creditor in step S916 of FIG. 9A decides not to either approve or deny the request, but, instead, forward the request to another creditor for review, as shown in step S948, the process of will forward the request to the AI lookup step 720 of FIG. 7B to begin the process again.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, via a computing device, a request from a requester for credit for participation in a project for production of a hardware or a software product;
requesting, via the computing device, verification from a creditor that the requester participated in the project, including using an artificial intelligence (AI) determination engine to determine if the request includes enough data regarding who, what, when, and where of the project and the creditor and in response to the creditor being registered in a credit handling system and being in an authoritative position with regards to the project such that the creditor is able to vouch for the request for the credit from the requestor, proceeding with processing the request;
in response to verification of credit from the creditor, acknowledging the credit in a credit handling system comprising a hardware storage retrieval device configured to allow access to the acknowledgment of credit by users other than the requester and the creditor; and
in response to the creditor not verifying the request, informing, via the computing device, the requestor that the request has been denied.

2. The computer-implemented method of claim 1, further comprising, in response to the verification of credit from the creditor, providing, via the computing device, a confidence score of the creditor's verification based on data regarding the creditor's level of participation in the project.

3. The computer-implemented method of claim 2, further comprising, in response to the providing of the confidence score of the creditor's verification, requesting, via the computing device, whether the requester wants to request credit from another creditor to obtain a higher confidence score.

4. The computer-implemented method of claim 1, further comprising, in response to a forwarding request by the creditor, forwarding, via the computing device, the request to another creditor.

5. The computer-implemented method of claim 1, wherein both the requester and the creditor are required to be registered with the credit handling system to request and vouch for credit for contributions to the project.

6. The computer-implemented method of claim 1, wherein the requester lists at least one possible creditor contact information registered with the credit handling system.

7. The computer-implemented method of claim 1, further comprising determining, via the computer, whether a creditor listed by the requester exists as a verified user of the credit handling system.

8. The computer-implemented method of claim 7, further comprising, in response to determining that the creditor listed by the requester is not a verified user of the credit handling system, whether enough information is provided in the request to invite another creditor that is a verified user of the credit handling system.

9. The computer-implemented method of claim 1, wherein the product is at least one of an audio recording or a video recording.

10. The computer-implemented method of claim 1, wherein the project is a previously completed project.

11. A credit requesting and handling system for providing credit to a requester for participation in a project for production of a hardware or a software product, comprising:
a credit requesting system configured to receive a request from the requester for credit for participating in the project from a creditor, wherein the credit requesting system includes an artificial intelligence (AI) determination engine to determine if the request includes enough data regarding who, what, when, and where of the project and the creditor and in response to the creditor being registered in a credit handling system and being in an authoritative position with regards to the project such that the creditor is able to vouch for the request for the credit from the requestor, proceeding with processing the request; and a credit handling system configured to provide the request to the creditor that participated in the project to request the creditor to vouch for participation of the requester in the project, and to store verification from the creditor that the requester participated in the project in a hardware storage retrieval device configured to allow access to the acknowledgment of credit by users other than the requester and the creditor.

12. The credit requesting and handling system of claim 11, wherein both the requester and the creditor are required to be registered with the credit requesting and handling system to request and vouch for credit for contributions to the project.

13. The credit requesting and handling system of claim 11, wherein the credit handling system is configured to, in response to the vouching from the creditor, provide a confidence score of the creditor's vouching based on data regarding the creditor's level of participation in the project.

14. The credit requesting and handling system of claim 13, wherein the credit handling system is configured to, in response to the providing of the credit score/confidence score of the creditor's vouching, request whether the requester wants to request credit from another creditor to obtain a higher confidence score.

15. A computer program product for providing credit to a requestor for participation in a project, the computer program product comprising a computer readable storage medium having program instructions embodied therewith, the program instructions executable by a computing device to cause the computing device to:
 receive a request from the requester for credit for participation in the project;
 request verification from a creditor that the requester participated in the project, including using an artificial intelligence (AI) determination engine to determine if the request includes enough data regarding who, what, when, and where of the project and the creditor and in response to the creditor being registered in a credit handling system and being in an authoritative position with regards to the project such that the creditor is able to vouch for the request for the credit from the requestor, proceeding with processing the request;
 in response to verification of credit from the creditor, acknowledge the credit in the credit handling system accessible by the requester; and
 in response to the creditor not verifying the request, inform the requestor that the request has been denied.

16. The computer program product of claim 15, further comprising program instructions executable to cause the computing device to:
 in response to the providing of the confidence score of the creditor's verification, request whether the requester wants to request credit from another creditor to obtain a higher confidence score.

17. The computer program product of claim 16, further comprising program instructions executable to cause the computing device to:
 in response to a forwarding request by the creditor, forward the request to another creditor.

18. The computer program product of claim 15, wherein both the requester and the creditor are required to be registered with the credit handling system to request and vouch for credit for contributions to the project.

19. The computer program product of claim 15, wherein the requester lists at least one possible creditor contact information registered with the credit handling system.

20. The computer-implemented method of claim 1, further comprising, in response to a determination that the request does not include sufficient data regarding who, what, when, and where of the project, providing, via the computing device, an error message to the requestor.

* * * * *